March 1, 1960   F. A. VAN VOOREN   2,927,194
WATER CONTROL SYSTEMS FOR WELDING MACHINES
Filed Aug. 8, 1958
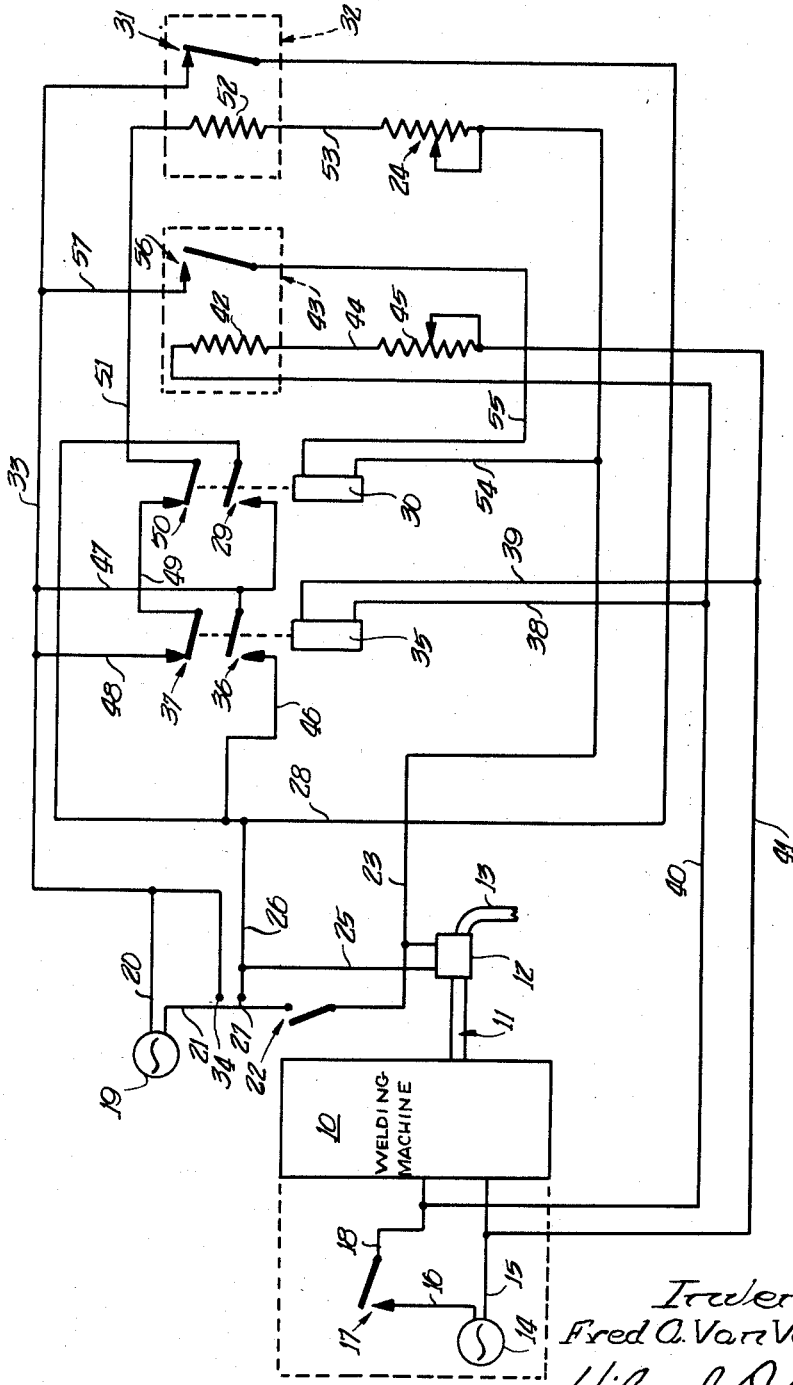
Inventor
Fred A. Van Vooren
Hilmond O. Vogel
Attorney

United States Patent Office 2,927,194
Patented Mar. 1, 1960

2,927,194

WATER CONTROL SYSTEMS FOR WELDING MACHINES

Fred A. Van Vooren, East Moline, Ill.

Application August 8, 1958, Serial No. 754,038

20 Claims. (Cl. 219—108)

This invention relates generally to welding machines, and more specifically to an improved electric control system for controlling the application of a cooling liquid such as water to the necessary parts of a welding machine.

Although the problem of cooling a device such as a welding machine with water appears simple upon first impression, the problem becomes complicated when consideration is given to the industrial requirements for both water and welding machines. Due to the rapid build-up or increase of heat during a welding operation and the impracticability of cooling at the same rate, industrial welders have extremely variable cooling requirements. If a welder is used intermittently with long periods of time between successive welds no cooling other than that provided during actual welding may be required. Further, a welder may be used successively with short periods of time between each weld and yet not require additional cooling if the total elapsed time of welding is relatively short. However, as the welding machine is used for longer welding operations or for short successive welding operations over a relatively long period of time additional cooling is necessary. Merely providing unmeasured amounts of additional cooling does not effectively solve the problem since it has been found that over-cooling will often result in condensation of water vapor on the welding machine which can easily cause electrical failures in the machine. Therefore, it is desirable that the amount of cooling provided accurately match the cooling requirements of the welding machine.

The amount of water used in cooling a welding machine is also important where that water must be purchased or delivered to the machine at some relatively considerable expense. Where an industrial plant has relatively heavy water requirements for other purposes it is important to effect economies in the use of cooling water for the welding machines.

The object of the present invention is to provide a control system for cooling water for a welding machine which effectively solves the problems noted above in regard to welding loads and economies of water use.

It is a further object of the present invention to provide an electrical control system for the cooling water of a welding machine which will operate to constantly adjust the flow of cooling water to the welding machine directly to the heating load of the machine.

It is a further object of the present invention to provide a control system for the cooling water of a welding machine wherein the control system is simple, positive in operation, and relatively free from failure.

Other objects and features of the present invention will be apparent upon a perusal of the following specification and drawing which diagrammatically shows the detailed construction of the present invention.

The present embodiment is the preferred embodiment but it is to be understood that changes can be made in the present embodiment by one skilled in the art without departing from the spirit and scope of the present invention.

Generally the present invention comprises an electrical circuit connected to control the flow of water through a solenoid valve to a welding machine. When the circuit is initially energized the solenoid valve is immediately operated and a certain time-delay relay operates a short time thereafter to close the flow of water from the solenoid valve and prepare the circuit for further operation. Further operation of the circuit to control the flow of water to the welding machine is then initiated by a switch which is associated with some convenient part of the welding machine; which switch will be closed whenever a welding operation takes place. This switch may be associated with the electrical means for a welder which lowers the welding head so that the switch is closed whenever the welding head is lowered to the work piece to perform a welding operation. The circuit further includes a second time-delay relay and a number of fast acting relays which function in the circuit to provide for delivery of cooling water in amounts commensurate with the heating load of the welding machine.

The single figure is a circuit diagram of the present invention.

For a detailed description of the present invention reference is made to the drawing. The welding machine 10 which may be of any suitable type known in the art is provided with a water delivery conduit 11 which has its outlet end so disposed in relation to the welding machine 10 that the parts of the welding machine 10 heated during the welding operations are efficiently cooled by water from that outlet. The inlet end of the water conduit 11 is connected to a solenoid valve 12. The solenoid valve 12 which may be of any suitable type known in the art will open to permit water to flow therethrough whenever the solenoid coil thereof is energized. A source of water 13 is connected to the inlet side of the solenoid valve 12. A power source 14 is shown associated with the welding machine 10 for providing power for the welding operations of the machine 10. One side of the source of power 14 is connected to a conductor 15 which in turn is connected to the welding machine 10. The other side of the source of power 14 is connected to a conductor 16 which in turn is connected to one side of a switch 17. The other side of the switch 17 is connected to a conductor 18 which in turn is connected to the welding machine 10. The switch 17 is closed by means (not shown) whenever a welding operation of the welding machine 10 is initiated and is opened whenever a welding operation is completed. The further connection of the conductors 15 and 18 in the welding machine 10 need not be here described since it is only important herein that the switch 17 follow the welding cycles of the machine.

Another source of power 19, which may be the same as power source 14, is provided for operation of the present invention. One side of the power source 19 is connected to one end of conductor 20, and the other side thereof is connected to one end of conductor 21. The other end of conductor 21 is connected to one side of a switch 22. The other side of the switch 22 is connected to one end of conductor 23. The other end of conductor 23 is connected to one end of the resistance of a potentiometer 24. The movable arm of the potentiometer 24 is also connected to conductor 23. One side of the solenoid coil of the solenoid valve 12 is connected to conductor 23. The other side of the solenoid coil of the solenoid valve 12 is connected to one end of conductor 25. The other end of conductor 25 is connected to conductor 26. One end of conductor 26 is provided with a contact 27, and the other end of conductor 26 is connected to conductor 28. One end of conductor 28 is connected to one side of the normally open contacts 29 of relay 30. The other end of conductor 28 is connected to one side of the normally closed contacts 31 of the thermostatic type time-delay relay 32. The other side of the contacts 31 of relay 32 is connected to one end of conductor 33. The other end of conductor 33 is connected to a contact 34. Conductor 20 is connected to conductor 33.

Relay 35 is provided with a set of normally open contacts 36 and a set of normally closed contacts 37. One side of the coil of relay 35 is connected to conductor 38 and the other side of the coil of relay 35 is connected to one end of conductor 39. The other end of conductor 38 is connected to conductor 40, and the other end of conductor 39 is connected to conductor 41. One end of conductor 40 is connected to conductor 18, and one end of conductor 41 is connected to conductor 15 at the welding machine 10. The other end of conductor 40 is connected to one side of the heater element 42 of the thermostatic time-delay relay 43. The other side of the heater element 42 of relay 43 is connected to one end of conductor 44, and the other end of conductor 44 is connected to one side of the resistance of potentiometer 45. The other side of the resistance of potentiometer 45 is connected to the other end of conductor 41. The movable arm of the potentiometer 45 is also connected to conductor 41. One side of the normally open contacts 36 of relay 35 is connected to one end of conductor 46 and the other end of conductor 46 is connected to conductor 28. The other side of the normally open contacts 36 of relay 35 is connected to conductor 47. One end of conductor 47 is connected to the side of the normally open contacts 29 of relay 30 opposite from that previously described as connected to conductor 28. The other end of conductor 47 is connected to conductor 33. One side of the normally closed contacts 37 of relay 35 is connected through conductor 48 to conductor 33. The other side of the normally closed contacts 37 is connected to one end of conductor 49. The other end of conductor 49 is connected to one side of the normally closed contacts 50 of relay 30. The other side of the normally closed contacts 50 of relay 30 is connected to one end of conductor 51. The other end of conductor 51 is connected to one side of the heater element 52 of relay 32. The other side of the heater element 52 of relay 32 is connected by conductor 53 to the end of the resistance of potentiometer 24 opposite from that previously described as connected to conductor 23.

One side of the coil of relay 30 is connected through conductor 54 to conductor 23. The other side of the coil of relay 30 is connected to one end of conductor 55. The other end of conductor 55 is connected to one side of the normally open contacts 56 of relay 43. The other side of contacts 56 of relay 43 is connected by conductor 57 to conductor 33.

The relays 30 and 35 are of the normally fast-acting type wherein the operation and restoration time of the contacts is measured in milliseconds. The thermostatic type time-delay relays 43 and 32 are of the type having a heater for heating a thermostatically responsive element in turn opening and closing a set of contacts wherein the time necessary for the opening or closing of the contacts thereof is measured in seconds from the energization and de-energization of the heating elements 42 and 52 thereof. An example of such thermostatic relays are those produced by the Amperite Company. The resistances of the potentiometers 45 and 24 which are respectively in series circuit with the heater elements 42 and 52 of the respective relays 43 and 32 are provided for varying the voltage drop across the heater elements 42 and 52 to thereby change the time for heating and cooling of the thermostatically responsive elements and vary the operation and restoration time of the contacts 56 and 31 of relays 43 and 32 respectively to conform to the particular characteristics of the welding machine 10.

Turning next to a detailed description of the operation of the present invention in order that the construction thereof may be more readily understood, reference is again made to the drawing. When the switch 22 is closed, circuits for the energization of the coil of the solenoid valve 12 and the heater element 52 of the relay 32 are completed. The circuit for the solenoid 12 is as follows: from one side of the source of power 19, conductor 21, switch 22, conductor 23 the solenoid coil of solenoid valve 12, conductor 25, conductor 26, conductor 28, contacts 31 of relay 32, conductor 33, and conductor 20 to the other side of the source of power 19. With the operation of solenoid valve 12 cooling water will flow to the welding machine 10. The circuit for the energization of heater element 52 is as follows: from one side of the source of power 19, conductor 21, switch 22, conductor 23, potentiometer 24, conductor 53, heater element 52 of relay 32, conductor 51, normally closed contacts 50 of relay 30, conductor 49, normally closed contacts 37 of relay 35, conductor 48, conductor 33, and conductor 20 to the other side of the source of power 19. After a number of seconds, heater element 52 will cause contacts 31 of relay 32 to open, breaking the previously described circuit for the operation of the solenoid valve 12. The solenoid valve 12 will then restore cutting off the flow of cooling water to the welding machine 10. The subject invention is then prepared for further operation and the relay 32 provides a safety feature for controlling the flow of cooling water since the cooling water will not be stopped until relay 32 operates to open the contacts 31.

Upon the closing of switch 17 coincident with the beginning of a welding operation, circuits for the operation of relays 35 and 43 are completed. The circuit for the operation of relay 35 is as follows: from one side of the source of power 14, conductor 15, conductor 41, conductor 39, the relay coil of relay 35, conductor 38, conductor 40, conductor 18, switch 17, and conductor 16 to the other side of the source of power 14. Relay 35 in operating will close its contacts 36 and open contacts 37. The opening of contacts 37 will break the previously described circuit for the energization of the heater element 52 of relay 32.

The circuit for the energization of the heater element 42 of relay 43 is as follows: from one side of the source of power 14, conductor 15, conductor 41, potentiometer 45, conductor 44, heater element 42 of relay 43, conductor 40, conductor 18, switch 17, and conductor 16 to the other side of the source of power 14. As the heater element 42 heats the thermostatic element controlling the contacts 56, the de-energized heater element 52 will permit the thermostatic element thereof to cool moving the contacts 31 of relay 32 toward the closed position.

The closing of contacts 36 of relay 35 completes the following circuit for the operation of solenoid valve 12: from one side of the source of power 19, conductor 21, switch 22, conductor 23, the solenoid coil of solenoid valve 12, conductor 25, conductor 26, conductor 28, conductor 46, contacts 36 of relay 35, conductor 47, conductor 33, and conductor 20 to the other side of the source of power 19. With the operation of the solenoid valve 12, cooling water will be delivered to the welding machine 10. If the welding cycle is a short one or, in other words, if the welding operation is completed and switch 17 opened before contacts 56 of relay 43 are closed, the previously described operating circuit for relay 35 will be opened, and relay 35 will restore to close contacts 37 and open contacts 36. With the opening of contacts 36, the last described circuit for operation of solenoid valve 12 will be opened and solenoid valve 12 will restore cutting off the flow of cooling water to the welding machine 10. The de-energization of relay 35 again completes at contacts 37 the previously described circuit for the energization of heater element 52 of relay 32 to thereby cause relay contacts 31 to remain open. The opening of switch 17 also breaks the previously described circuit for the energization of heater element 42 and contacts 56 will therefore remain open.

Considering next a welding cycle of longer duration, as previously noted the closing of switch 17 causes the operation of relay 35, which in turn through its contacts 36 causes the operation of the solenoid valve 12, and through its contacts 37 causes the opening of the operating circuit for the heater element 52 of relay 32. Assuming that sufficient time elapses so that the contacts 56 of relay 43 are closed before the end of the welding cycle of the machine 10, the closing of contacts 56 will complete the following circuit for the energization of relay 30: from one side of the source of power 19, conductor 21, switch 22, conductor 23, conductor 54, the relay coil of relay 30, conductor 55, contacts 56 of relay 43, conductor 57, conductor 33, and conductor 20 to the other side of the source of power 19. Relay 30 in operating will close its contacts 29 and open its contacts 50. The closing of contacts 29 will complete the following alternate circuit for the operation of solenoid valve 12: from one side of the source of power 19, conductor 21, switch 22, conductor 23, the solenoid coil of solenoid valve 12, conductor 25, conductor 26, conductor 28, contacts 29 of relay 30, conductor 47, conductor 33, and conductor 20 to the other side of the source of power 19. The opening of contacts 50 will further break the previously described circuit for the energization of the heater element 52 of relay 32. The time delay period before relay 32 will cool sufficiently to close contacts 31 is set as a longer period than that necessary for closing of contacts 56 of relay 43 by a proper adjustment of potentiometer 24. If the welding cycle is now ended, and the switch 17 opened, the energization circuit for relay 35 will be opened, and relay 35 will restore opening contacts 36 and closing contacts 37. The energization circuit for the heater element 42 of relay 43 will also be opened and the thermostatic element thereof will begin to cool to cause an opening of the contacts 56 after a certain period of time depending upon the setting of the potentiometer 45 and the length of time that the heater element 42 had been energized. The solenoid valve 12 will not restore at this time since the valve 12 will be maintained energized over the alternate circuit therefor previously described as including the contacts 29 of relay 30. As long as either relay 35 or 30 is operated, the energization circuit for the heater element 52 of relay 32 will be opened permitting a cooling thereof and a movement of contacts 31 toward the closed position. When relay 43 is cooled sufficiently to open contacts 56 thereof, the previously described circuit for the energization of relay 30 will be opened and relay 30 will restore to close its contacts 50 and open its contacts 29. The alternate circuit for maintaining solenoid valve 20 operated will be opened and the solenoid valve 12 will close to stop the flow of water to the welding machine 10 if the previous cycle of operation was not long enough to permit closing of contacts 31 of relay 32.

Assuming next that the previously noted operation time of the welding machine 10 was sufficiently long so that the relay 32 cooled sufficiently to close contacts 31 before contacts 56 of relay 43 were opened. Under this condition the opening of contacts 56 of relay 43 will not cause a stopping of the flow of cooling water to the welding machine 10 since the closing of contacts 31 of relay 32 will complete the first described circuit for the operation of solenoid valve 10. With relays 35 and 30 restored, the previously described circuit for the energization of heater element 52 of relay 32 is completed and the operating circuit for solenoid valve 12 will not be opened until relay 32 has heated sufficiently to again open contacts 31.

Thus it may be seen that the solenoid valve 12 is varied in time of operation upon and after the completion of a welding operation dependent upon the length of time of the welding cycle. Although the various previously described welding cycles were noted of one continuous time period either short, intermediate or long in length, this was done merely for purposes of illustration to clarify the construction of the present invention. The time periods between cycles of operation of the welding machine are also important and will affect overall operation of the present invention. Short welding cycles which are rapidly repeated and which would normally cause a gradual build-up in heat in the welding machine will be effectively matched by the operation of the present invention to correspondingly lengthen the cooling cycle of the solenoid valve 12 to provide the added cooling needed. In the operation of the instant invention it is immaterial that some welding cycles may be longer than others or that some periods of time between welding cycles will be longer than others since the present invention will effectively operate under all conditions of operation and non-operation of the welding machine 10 to efficiently match the amount of cooling provided with the build-up of heat in the welding machine 10.

Although the present invention has been described as specifically applied to a welding machine, it may also be used to cool any other device wherein the amount of heat which builds up in the device is a function of the periods of time that the device is operating and restored. By use of the contacts 27 and 34 any number of thermostatic switches may be used to further control the operation of solenoid valve 12.

Having described the invention, what is considered new and desired to be protected by Letters Patent is:

1. A cooling system for a device having variable cooling requirements, comprising a switch associated with said device and operating and restoring responsive to operations and restorations of said device, cooling means operable to cool said device, and circuit means connected to said switch and said cooling means for operating and restoring said cooling means, said circuit means being formed to operate responsive to operations of said switch to operate said cooling means and to operate responsive to restorations of said switch which occur within a certain predetermined period of time after the immediately preceeding operation of said switch for substantially immediately restoring said cooling means, said circuit means being further formed to operate responsive to restorations of said switch which occur after said switch has remained operated for a period of time longer than said certain period of time for continuing the operation of said cooling means a certain predetermined second period of time after the restoration of said switch.

2. A cooling system for a device having variable cooling requirements comprising, a switch associated with said device and operating and restoring responsive to operations and restorations of said device, cooling means operable to cool said device, and circuit means connected to said switch and said cooling means and operating responsive to operations and restorations of said switch for operating and restoring said cooling means, said circuit means being further formed to operate responsive to operations of said switch for periods of time longer than a certain predetermined period of time for continuing the operation of said cooling means a certain predetermined second period of time after the restoration of said switch, said circuit means being further formed to operate responsive to operations of said switch for periods of time longer than a certain predetermined third period of time for continuing the operation of said cooling means a certain predetermined fourth period of time after the restoration of said switch.

3. A cooling system for a device having variable cooling requirements comprising, a switch associated with said device and operating and restoring responsive to operations and restorations of said device, cooling means operable to cool said device, relay means connected to said switch and to said cooling means and operating and restoring responsive to operations and restorations of said switch for operating and restoring said cooling means, circuit means connected to said switch and to said cooling means and operating responsive to operations of said switch for periods of time longer than a certain predetermined period of time for completing a circuit for maintaining said cooling means operated a certain predetermined second period of time after the restoration of said switch.

4. A cooling system for a device having variable cooling requirements and having cooling means operable to cool said device comprising, a switch associated with said device and operating and restoring responsive to operations and restorations of said device, relay means connected to said switch and to said cooling means and operating and restoring responsive to operations and restorations of said switch for operating and restoring said cooling means, a relatively substantially slow acting relay having a pair of contacts closed when said slow acting relay is de-energized, circuit means connecting the contacts of said slow acting relay to said cooling means so that said cooling means is operated when said contacts of said slow acting relay are closed, second circuit means connecting said slow acting relay to said relay means so that said slow acting relay is energized responsive to restorations of said relay means and de-energized responsive to operations of said relay means.

5. A cooling system for a device having variable cooling requirements and having cooling means operable to cool said device comprising, a switch associated with said device and operating and restoring responsive to operations and restorations of said device, relay means connected to said switch and to said cooling means and operating and restoring responsive to operations and restorations of said switch for operating and restoring said cooling means, a relatively substantially slow acting relay having a pair of contacts closed when said slow acting relay is de-energized, circuit means connecting the contacts of said slow acting relay to said cooling means so that said cooling means is operated when said contacts of said slow acting relay are closed, second circuit means connecting said slow acting relay to said relay means so that said slow acting relay is energized responsive to restorations of said relay means and de-energized responsive to operations of said relay means, a second relatively substantially slow acting relay having a pair of contacts open when said second slow acting relay is de-energized, third circuit means connecting the contacts of said second slow acting relay to said cooling means so that said cooling means is operated when the contacts of said second slow acting relay are closed, fourth circuit means connecting said second slow acting relay to said switch so that said second slow acting relay is energized responsive to operations of said switch, said first and second slow acting relays being formed so that the period of time necessary for said first slow acting relay to open the contacts thereof is substantially longer than the period of time necessary for said second slow acting relay to close the contacts thereof.

6. A cooling system for a device having variable cooling requirements and having cooling means operable to cool said device comprising, a switch associated with said device and operating and restoring responsive to operations and restorations of said device, relay means connected to said switch and to said cooling means and operating responsive to operations and restorations of said switch for operating and restoring said cooling means, time delay means connected to said relay means and operating responsive to the operation of said relay means to initiate a timing cycle, circuit means connected to said time delay means and operating responsive to the completion of said timing cycle to operate said cooling means a certain predetermined period of time after the restoration of said switch.

7. A cooling system for a device having variable cooling requirements comprising, a switch associated with said device and operating and restoring responsive to operations and restorations of said device, cooling means operable to cool said device, relay means connected to said switch and to said cooling means and operating responsive to operations and restorations of said switch for operating and restoring said cooling means, time delay means connected to said relay means and operating to initiate a timing cycle responsive to the operation of said relay means, second time delay means connected to said switch and operating responsive to the operation of said switch to initiate a second timing cycle, circuit means operating responsive to the completion of said first time delay cycle to operate said cooling means a certain predetermined period of time after the restoration of said switch, second circuit means operating responsive to the completion of said second timing cycle to maintain said cooling means operated a certain predetermined second period of time after the restoration of said relay means.

8. A cooling system for a device having variable cooling requirements comprising, a switch associated with said device and operating and restoring responsive to operations and restorations of said device, cooling means operable to cool said device, a first relay means connected to said switch and operating and restoring responsive to operations and restorations of said switch, second relay means, third relay means having adjustable means for delaying the operation of said third relay means for periods of time substantially longer than the periods of time for operation of said first and second relay means, fourth relay means having adjustable time delay means for delaying the operation of said fourth relay means for periods of time substantially greater than the operation periods of said first, second and third relay means, said third relay means connected to operate said second relay means, said second relay means connected to operate said cooling means, said fourth relay means connected to operate said cooling means.

9. In a cooling fluid control system for a device having cooling requirements directly proportional to the total operated time of said device in unit time, cooling means operable to cool said device, a thermostatic relay having a pair of normally closed contacts and operable to open said contacts thereof a certain predetermined period of time after the initial energization thereof, circuit means connected to said contacts of said thermostatic relay and to said cooling means to operate said cooling means when said contacts of said thermostatic relay are closed, a source of power, second circuit means for connecting said source of power to said thermostatic relay so that said cooling means is operated upon the initial connection of said source of power to said thermostatic relay and restored after the period of time necessary for said thermostatic relay to open said contacts thereof, means associated with said device and connected to said cooling means and said second circuit means for operating said cooling means responsive to operations of said device and simultaneously disconnecting said source of power from said thermostatic relay.

10. In a system as claimed in claim 9, wherein a second thermostatic relay having a pair of normally open contacts is provided, said second thermostatic relay being formed so that the contacts thereof are closed a certain predetermined period of time after the initial energization thereof, third circuit means connected to said contacts of said second thermostatic relay and to said cooling means to operate said cooling means after the period of time necessary for said second thermostatic relay to close said contacts thereof, and means for connecting said source of power to said second thermostatic relay for energization thereof responsive to operations of said device.

11. In a system as claimed in claim 10, wherein separate means is provided for said first and second thermostatic relay for varying the period of time necessary for the opening and closing of the contacts of said first and second thermostatic relays.

12. In a cooling fluid control system for a device having cooling requirements directly proportional to the total operated time of said device in unit time, cooling means operable to cool said device, a thermostatic relay having a pair of normally closed contacts and operable to open said contacts thereof a certain predetermined period of time after the initial energization thereof, circuit means connected to said contacts of said thermostatic relay and to said cooling means to operate said cooling means when said contacts of said thermostatic relay are closed, a source of power, second circuit means for connecting said source of power to said thermostatic relay so that said cooling means is operated upon the initial connection of said source of power to said thermostatic relay and restored after the period of time necessary for said thermostatic relay to open said contacts thereof, a switch associated with said device and operating and restoring responsive to operations and restorations of said device, third circuit means connected to said switch, said cooling means and said second circuit means and operating responsive to operations and restorations of said switch for operating and restoring said cooling means and for respectively simultaneously disconnecting and connecting said source of power to said thermostatic relay.

13. In a system as claimed in claim 12, wherein said third circuit means includes means operating responsive to operations of said switch for periods of time longer than a certain predetermined period of time for continuing the operation of said cooling means a certain predetermined second period of time after the restoration of said switch.

14. In a system as claimed in claim 13, wherein said certain predetermined first period of time is substantially less than the period of time necessary for the operation of said thermostatic relay to close the contacts thereof.

15. In a cooling fluid control system for a device having cooling requirements directly proportional to the total operated time of said device in unit time, a thermostatic relay having a pair of normally closed contacts and operable to open said contacts thereof a certain predetermined period of time after the initial energization thereof, circuit means connected to said contacts of said thermostatic relay and to said cooling means for operating said cooling means when said contacts of said thermostatic relay are closed, a source of power, second circuit means for connecting said source of power to said thermostatic relay to energize said thermostatic relay whereby said cooling means is operated upon the initial energization of said thermostatic relay and restored after the period of time necessary for said thermostatic relay to open said contacts thereof, a switch associated with said device and operating and restoring responsive to operations and restorations of said device, a relay having two pairs of contacts, third circuit means connecting said relay to said switch so that said relay is operated and restored responsive to operations and restorations of said switch, fourth circuit means including one pair of said two pairs of relay contacts and connected to said cooling means for operating said cooling means responsive to operations of said relay, means connecting the other pair of said two pairs of contacts in said second circuit means so that said source of power is disconnected from said thermostatic relay responsive to operation of said relay and connected to said thermostatic relay responsive to restoration of said relay.

16. In a cooling fluid control system for a device having cooling requirements directly proportional to the total operated time of said device in unit time, a thermostatic relay having a pair of normally closed contacts and operable to open said contacts thereof a certain predetermined period of time after the initial energization thereof, circuit means connected to said contacts of said thermostatic relay and to said cooling means for operating said cooling means when said contacts of said thermostatic relay to energize said thermostatic relay whereby said cooling means is operated upon the initial energization of said thermostatic relay and restored after the period of time necessary for said thermostatic relay to open said contacts thereof, a switch associated with said device and operating and restoring responsive to operations and restorations of said device, a relay having two pairs of contacts, third circuit means connecting said relay to said switch so that said relay is operated and restored responsive to operations and restorations of said switch, a second thermostatic relay having a pair of normally opened contacts and operable to close said contacts thereof a certain predetermined period of time after the initial energization thereof, fourth circuit means connected to said contacts of said second thermostatic relay and to said cooling means for operating said cooling means when said contacts of said second thermostatic relay are closed, fifth circuit means connecting said second thermostatic relay to said switch so that said second thermostatic relay is energized responsive to operations of said switch whereby said cooling means is operated after the period of time necessary for said second thermostatic relay to close said contacts thereof, sixth circuit means including one pair of said two pairs of relay contacts and connected to said cooling means for operating said cooling means responsive to operations of said relay, means connecting the other pair of said two pairs of contacts in said second circuit means so that said source of power is disconnected from said first thermostatic relay responsive to operations of said relay and connected to said first thermostatic relay responsive to restorations said relay.

17. In a system as claimed in claim 16, wherein a selectively variable resistance element is provided in series with each of said first and second thermostatic relays for adjusting the voltage applied to said first and second thermostatic relays to selectively vary the periods of time necessary for said first and second thermostatic relays to open and close the contacts thereof.

18. In a system as claimed in claim 16, wherein the periods of time necessary for the operation and restoration of said relay is substantially instantaneous relative to the periods of time necessary for the operations and restorations of said first and second thermostatic relays to open and close the contacts thereof, and wherein the period of time necessary for said first thermostatic relay to open the contacts thereof is substantially longer than the period of time necessary for said second thermostatic relay to close the contacts thereof.

19. In a cooling fluid control system for a device having cooling requirements directly proportional to the total operated time of said device in unit time, a thermostatic relay having a pair of normally closed contacts and operable to open said contacts thereof a certain predetermined period of time after the initial energization thereof, circuit means connected to said contacts of said thermostatic relay and to said cooling means for operating said cooling means when said contacts of said thermostatic relay are closed, a switch associated with said device and operating and restoring responsive to operations and restorations of said device, a relay having a pair of normally closed contacts and a pair of normally open contacts, second circuit means connecting said relay to said switch so that said relay is operated and restored responsive to operations and restorations of said switch, a second thermostatic relay having a pair of normally open contacts and operable to close said contacts thereof a certain predetermined period of time after the initial energization thereof, third circuit means connecting said second thermostatic relay to said switch so that said second thermostatic relay is energized and de-energized responsive respectively to operations and restorations of said switch, a second relay having a pair of normally closed contacts and a pair of normally open contacts, a source of power, fourth circuit means connecting said source of power, said second relay and said contacts of said second thermostatic relay in series so that said second relay is operated responsive to the closing of the contacts of said second thermostatic relay, fifth circuit means connecting said power source and said cooling means and parallel with the normally open contacts of said first and second relays so that said cooling means is operated responsive to the operations in the alternative of said first and second relays, sixth circuit means connecting said first thermostatic relay in series with the normally closed contacts of said first and second relays and said source of power so that said first thermostatic relay is de-energized responsive to the operations in the alternative of said first and second relays.

20. In a system as claimed in claim 19, wherein said third circuit means includes a selectively variable resistance element in series with said second thermostatic relay for varying the voltage applied to said second thermostatic relay so that the period of time necessary for the closing of the contacts of said second thermostatic relay may be selectively varied, and wherein said sixth circuit means includes a selectively variable resistance element in series with said first thermostatic relay for varying the voltage applied to said first thermostatic relay so that the period of time necessary for the opening of the contacts of said first thermostatic relay may be selectively varied.

References Cited in the file of this patent

UNITED STATES PATENTS 2,629,804     Van Vooren  ----------- Feb. 24, 1953

FOREIGN PATENTS 878,733     France  ---------------- Oct. 26, 1942